UNITED STATES PATENT OFFICE.

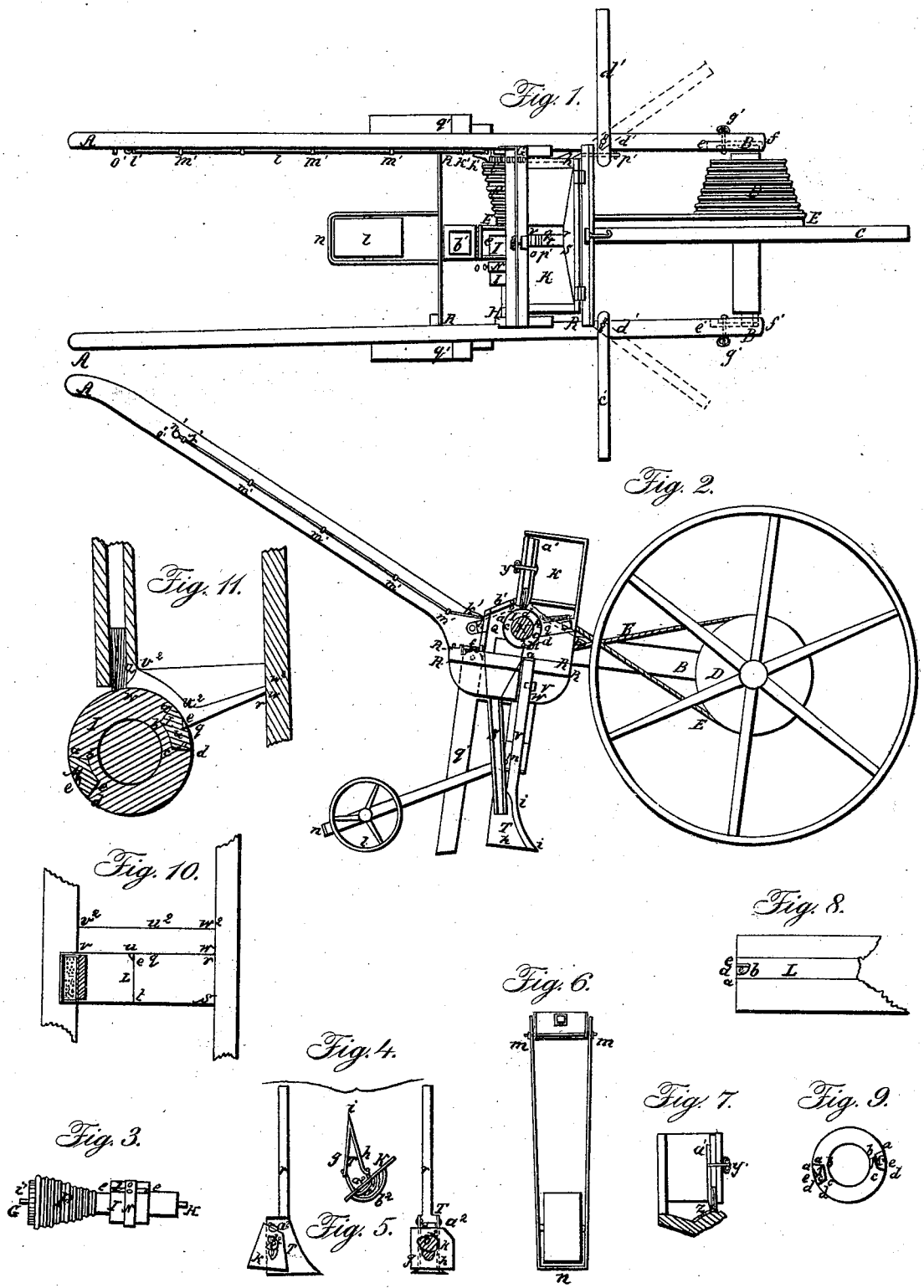
S. W. COLE.
Seed-Planter.
No, 1,729. Patented Aug. 25, 1840.

SAMUEL W. COLE, OF CHELSEA, MASSACHUSETTS.

IMPROVEMENT IN MACHINES FOR PLANTING CORN, &c.

Specification forming part of Letters Patent No. 1,729, dated August 25, 1840.

*To all whom it may concern:*

Be it known that I, SAMUEL W. COLE, of Chelsea, in the county of Suffolk and State of Massachusetts, have invented new and useful improvements in machinery for planting corn and such other seeds as may be successfully sown by said machinery, of which the following is a specification.

The said improvements, the principles thereof, and manner in which I have contemplated the application of the same, by which this may be distinguished from other inventions of a similar nature, together with such parts or combinations I claim as my invention and consider original and new, I have herein set forth and described, which description, taken in connection with the accompanying drawings herein referred to, forms my specification.

Figure 1 represents a top view of my improved seed-planter. Fig. 2 is a vertical section taken longitudinally through the machine. Figs. 3, 4, 5, &c., are detailed views of the different parts.

The machine herein described, and shown by drawings, is arranged as a drill-barrow, it being operated by a person taking hold of the handles A A, Figs. 1 and 2, of the side beams, A B A B.

A wheel, C, supported in bearings near the extremities B B of the sides A B A B, has a cone, D, of pulleys, of different diameters, around either of which, at pleasure, a crossed band, E E, extends to and around its opposite pulley of another series or cone of pulleys, F, Figs. 1, 3. The latter cone, F, is placed or formed on a horizontal shaft, G H, Figs 1, 2, 3, and by means of the band E E the shaft is revolved or put in motion.

A cylinder, I, of proper material, is fixed on the shaft G H, (see Figs. 1, 2, 3,) and a hopper, K, is placed above the said cylinder, the hopper being supported by suitable standards from the sides and formed in the usual manner, so as to cause any kind of seed that may be placed therein to slide or move to the bottom of the same. The cylinder I has grooves or proper-shaped spaces cut longitudinally in in its periphery or parallel with its axis, a section of said grooves being seen at a b c d, &c., Figs. 2, 7, 9, and 11, and their length being equal to that of the cylinder. The spaces thus formed in the cylinder are each to receive a slide, L or M, Figs. 2, 3, 7, 8, 9, 10, and 11, which passes under a circular ring or collar, N, fixed on the cylinder I, Figs. 1 and 3, and is secured therein by a clamping-screw, O.

Notches e e, of suitable size, according to the kind and quantity of seed to be sown, are to be cut on the end of the slides L and M. These notches will be more particularly described hereinafter.

The cylinder I, when placed in position, has part of its surface in the interior and part on the exterior of the hopper K, this latter part being covered by the box or casing Q, Figs. 1, 2. This box rests on the shelf R R R R, properly attached to the beams A B A B, and is held or secured in this position by a turning button, *f*, Fig. 2, or in any other suitable manner.

A conducting-pipe, s, Fig. 2, formed of tin or other proper metal, communicates with the box Q and the opening in the back of the tooth or plow T, Figs. 2, 4, and 5, which opens the earth or forms the furrow. The tooth or plow T (see Figs. 2, 4, and 5) is formed of two wings or shares, g h, terminating in front in a sharp edge or point, i. While the wing g is nearly straight or falls back from the sharp edge in front of point i with a very slight curve, (see Fig. 5,) the other wing, h, is more curved, as represented in the drawings, in order that the greater part of the earth displaced by the plow on entering the ground shall be thrown on the side of the furrow adjacent to wing h. By this construction of the plow only one coverer, k, Figs. 4 and 5, is necessary. This coverer is placed in a diagonal position (see Figs. 4 and 5) directly in the rear of the plow T, or between the same and the roller l, Figs. 1 and 2. Therefore as the plow enters the earth and forms a furrow the coverer replaces the earth, which is consolidated by the roller l as it passes over the same.

It will be seen that the roller l is supported by an iron frame, m n, Figs. 6 and 12. This frame is so attached to the barrow by a proper joint at its end m as to vibrate in a vertical direction, and therefore, whatever may be the depth of the tooth T in the soil, the roller is only resting or rolling over the surface of the same.

The coverer k is attached to the back of the plow or tooth T by a suitable hinge, so that when the plow sinks into the earth it will hang behind it like an inclined door, as it were, and will rise and fall as the plow sinks more or less into the earth. This is represented in Figs. 4 and 5, where $a^2$ is the hinge and $k$ the coverer.

A semicircular wire, $b^2$, may be fixed to the coverer, between which and the face of the coverer a stone or other proper weight may be placed and secured in cases where the coverer is not heavy enough itself.

The tube S terminates at a distance of three inches or, thereabout, above the bottom or lower edge of the plow, as seen in Fig. 2, and therefore when the plow is suddenly lifted from the surface of the ground and afterward dropped thereon it does not sink therein a sufficient distance to drive any earth into the lower part of the tube, by which it would be clogged or stopped up so as to prevent the seeds from dropping into the furrow. The tooth or plow T is attached to the end of the bar or rod U, Figs. 2, 4, the other extremity of this bar being inserted and moving vertically in a suitable hole (of the shape of the cross-section of the rod) in the block V, attached to the under side of the shelf R R R R. When the rod U is regulated so that the tooth T may penetrate the ground to the required depth it is confined in this position by a clamp-screw, W, placed on the side of the block V. Thus the plow may be adjusted to any depth to which we wish the seed to be placed beneath the surface of the soil.

It was before stated that a portion of the cylinder was always within the hopper K. This part is shown at $o\ p$, Figs. 1, 2, and 11. From the point $p$ the lower part of the hopper, or that part denoted by $q\ r\ s\ t$, Figs. 1 and 10, and $q\ r$, Figs. 2 and 11, slopes upward or forms an inclined plane down which the seed falls into the notches on the edge of the slides L or M, or periphery of the cylinder of which they form a portion. Now, in order that the seed may more effectually enter the notches or spaces above mentioned, the other portion of the bottom of the interior of the hopper is not only inclined, but part of it—viz., $n\ v$, Figs. 1 and 10, or that portion immediately contiguous to the end of the cylinder—is dropped somewhat below the circular edge of the said cylinder, as seen in Fig. 7 and by dotted lines in Fig. 11, where it is represented at the bottom $u$ as being the depth of the notch L below the periphery of the cylinder, and gradually lowers this depth until it rises to the periphery of the cylinder at $v$. From this line the bottom is curved upward so as to form a curved chute, $u\ v\ u^2\ v^2$, Figs. 1, 10, and 11, down which the seed falls sidewise into the end of the notch or space L, so that the notch or seed-receptacle is filled in two directions at the same time. The other portion, $u\ w\ u^2\ w^2$, of the bottom of the hopper is also inclined, as represented in Figs. 10 and 11, so as to give the seed a tendency to run toward the point $u$, and therefore the combination of the three chutes $u\ v$ $u^2\ v^2$, $q\ r\ s\ t$, $u\ w\ u^2\ w^2$ causes the seed in the hopper to converge nearly to one point, $n$, or to the notch $e$, in manner above described and explained.

A brush, $x$, Figs. 2 and 11, is placed directly over the top of the cylinder, the said brush making a part of the side of the hopper K. It rests on the cylinder and is placed in a vertical groove formed in the side of the hopper. The lower edge or parts of the bristles composing the brush should rest on the cylinder, and the point $z$ of a bent piece of wood or metal, $z\ a'$, may be adjusted to a greater or less distance above the surface of the cylinder I, and confined in such position by a clamping-screw, $y'$.

It will be seen in Fig. 2 that the lower part of the gage or piece $z\ a'$ is curved or bent toward the brush, and, when pressed or drawn against the brush by the clamp-screw $y'$, serves to slightly bend or incline the bristles or compress them for large seed, and to increase the stiffness and inclination for small seeds, when drawn up with a greater force applied to the clamp-screw $y'$.

The gage $z\ a'$ should be set at a distance from the surface of the cylinder proportional to the size and kind of seed to be planted, large seed—such as corn, &c.—requiring a much greater distance than small. If any portions of the seeds project above the notches or spaces $e\ e$, the elasticity of the bristles will permit them to pass by or through the brush without injury to the seed, large seed requiring a much greater distance between the bottom of the gage $z\ a'$ and the cylinder than small seeds. While the brush does this office it performs other duties—viz., that of removing the superfluous seed from the notch and preventing the seed adhering to the surface of the cylinder from passing out the hopper. As the ends of the bristles rest on the cylinder they clear it of seeds, and at the same time allow those which project from the notches or seed-receptacles to pass through the bristles, which, by their elasticity, immediately regain their place. This allows a free and easy operation in the passage of seeds without injury to them or impediment to the operations of the machine. The gage $z\ a'$ produces an outward inclination of the brush on the cylinder, which facilitates the passing out of the seed, prevents them from sticking in the bristles, and brings the inside bristles close together and rather stiffens the whole. The gage should be moved up from the cylinder a distance equal to about double the average diameter of the seeds to be dropped. This produces a closeness or body in the brush corresponding to the size of the seeds. By being near the points of the bristles it presses them more closely for small seeds, which require more firmness to prevent them escaping through or under the bristles, and less room for their small projections above the surface of the notch or seed-receptacle to pass out. By raising the gage for large seeds the brush is left free a greater space or distance between the bottom of the gage and top of the cylinder, which causes a looseness or flexibility in the brush and allows the larger projections from the notches to pass easily through; but it has sufficient compactness to retain large seeds, which are less likely to work out. This necessary change in the brush is further promoted by the curvature of the gage, by which the gage presses much harder on the brush when the gage is dropped near the cylinder.

The notches $e\ e$ should be formed as represented in Figs. 8 and 9, the first, $a\ b\ d$, Fig. 8, being carried vertically, as at $a\ d$, Fig. 9, and longitudinally, as $a\ b$, Fig. 8. The back of the notch is represented by $c\ d$, Fig. 9, and $c\ b\ d$, Fig. 8. Now, it will be perceived that when the cylinder brings the notch upward into the hopper the whole of the back $c\ d\ b$ of the notch is horizontal, or nearly so, the lower part, $d$, coinciding with the depressed portion $n\ v$, before described, of the lower part of the hopper, and therefore the back of the notch forms a shelf on which the seed piles itself while the notch is passing through the hopper. When the notch passes out of the hopper the front of the notch forms a gradual inclined plane or chute, down which the seed is easily projected and falls, not in a body, but is poured by degrees, as it were, into the seed-tube, and is thereby more scattered in the furrow than if it fell in a body, for during the small interval of time elapsing from the first seed dropping out of the space until the last falls the drill-barrow has moved ahead a short distance, whereby the seed is rather more scattered than it would be if it fell in a body. By this form of the notch or seed-receptacle the seed, on coming out of the hopper, is relieved entirely on the end $a\ c\ d$, Figs. 8 and 9, and cannot clog in the notch, but readily expands and drops by a slow motion of the cylinder, and is thrown off by centrifugal force when the cylinder revolves rapidly.

A small rectangular or other proper shaped piece of glass, $b'$, is inserted in the lid of the casing Q. The object for which the same is intended is in order that when the notches or said receptacles of the cylinder pass out of the hopper the person operating the barrow can see whether they are properly filled with seed, and whether the seed drops from the notch. By this arrangement the proper operation of the machine is insured, for the dropping of the seed comes under the eye of the operator.

In order to gage the parallelism of the furrows with each other, I attach long pieces of wood, $c'\ d'$, Fig. 1, to the sides A B, which turn on a pin or set-screw, $d'$, and may be adjusted to any angle equal to or less than a right angle to the side, as represented by the dotted lines, Fig. 1. On the end of each of these pieces I hang a piece of leather or cord, or other proper material, with a weight on the lower end, if necessary. As the machine is moved along this strip of leather or cord should trail or move in or near the last furrow, and thus by keeping it always therein the forward wheel, C, will traverse in a line parallel to the last furrow, thereby causing the tooth or plow T to move in said line. By setting the opposite piece of wood, with its hanging cord, to the proper angle on the other side the line for the next furrow may be marked out at the same time.

In order to tighten the band E E whenever necessary, the journals of the axis of the wheel C rests in supports or pieces of metal, $e'\ f'$, Fig. 1, placed and moving in suitable grooves formed inside of the side A B, and having a clamping-screw, $g'$, to secure them in any position. We have only to loosen the screw $g'$ and draw the wheel C outward (the pieces of metal $e'\ f'$ moving therewith) until the band is drawn sufficiently tight, when, by tightening the screw $g'$, the bearings or pieces $e'\ f'$ are secured in this position, and the looseness of the belt thus easily taken up.

When we wish to prevent the cylinder I from revolving we have only to drop the pawl $h'$, Figs. 1 and 2, upon a ratchet-wheel, $i'$, Figs. 1 and 3.

A wire, $k'\ l'$, one end of which is attached to the pawl $h'$, leads along the inside of the handle of the barrow to the hand of the operator. It is supported by proper clasps or staples, $m'\ m'\ m'$, and has on the other end a ring or other suitable contrivance, $n'$, which, when the pawl is drawn up from the ratchet-wheel $i'$, is hitched over a pin, $o'$. A counter-pawl, $p'$, is placed behind the ratchet, which operates against the teeth thereof, prevents any backward movement of the cylinder when the machine is drawn back by the operator, and, by the noise produced while the end of it drops from one tooth of the ratchet to another, is a tell-tale, which proves to the operator that the cylinder is in motion. When the pawl $h'$ is down the whole machine may be wheeled about with as much facility as a common hand-barrow and without dropping any seed, as in this case the band E E will slip in the groove of the small pulley on the axis of the cylinder I.

The notches or spaces in the slides L or M may be constructed of different sizes, according to the kind and quantity of seed to be planted, and in case corn or very large seed is to be sown the whole slide may be moved and clamped in any position by the screw O, so as to form a very large seed-receptacle, from which the corn may be readily dropped in a body into hills; or by making suitable-shaped receptacles in the slides the same effect may be produced. As the slides L and M are to be formed of wood, it will be seen that they may be made with a common penknife by any farmer using the machine, and as many may be formed with such different-shaped spaces or notches as his fancy or business may dictate. Notches may be formed in each end of the slide, so that by turning it end for end another notch of a different size may be used.

The ends G H of the journals of the cylinder may run on conical pivots formed on the extremities of screws, (represented by dotted lines in Fig. 1,) so that the position of the edge or end of the cylinders, with respect to the side or part of the hopper to which it is in apposition, may at any time be regulated by simply loosening one screw and tightening the other, when the cylinder is brought to the required position; also, friction will be greatly diminished by that arrangement of bearings. The legs $q$ vibrate at their tops on a pin or screw, so that they may be turned up when not in use; or as the tooth T enters the ground the lower ends of the legs will fall back sufficiently so as not to impede the operation of the machine. When the tooth T is raised out of the ground the legs fall down to nearly a perpendicular position, and then serve to sustain the machine.

Having thus described the nature of my invention or improvements and explained the mode of operation of the same, I shall now proceed to specifically point out such parts thereof as I claim to be my discovery:

1. Constructing the dropping-cylinder with changeable slides and forming receptacles in the same for receiving the seed from the hopper, also the mode of adapting the lower part of the hopper to the apertures in the end of the slides by forming it with chutes in the manner set forth, so as to better conduct the seed to the receptacles in the slides, the whole being arranged and operating substantially as above described.

2. The mode of compressing or regulating the stiffness of the brush X (which makes a part of the hopper) by means of the clamp and screw, in combination with the hopper and dropping-cylinder.

In testimony that the above is a true description of my said invention and improvement I have hereto set my signature this 16th day of July, in the year of our Lord 1840.

SAMUEL W. COLE.

Witnesses:
CALEB EDDY,
EZRA LINCOLN, Jr.